May 31, 1927. 1,630,947
C. R. JENKS
SODA FOUNTAIN DRAFT ARM VALVE
Filed Feb. 4, 1926 2 Sheets-Sheet 1
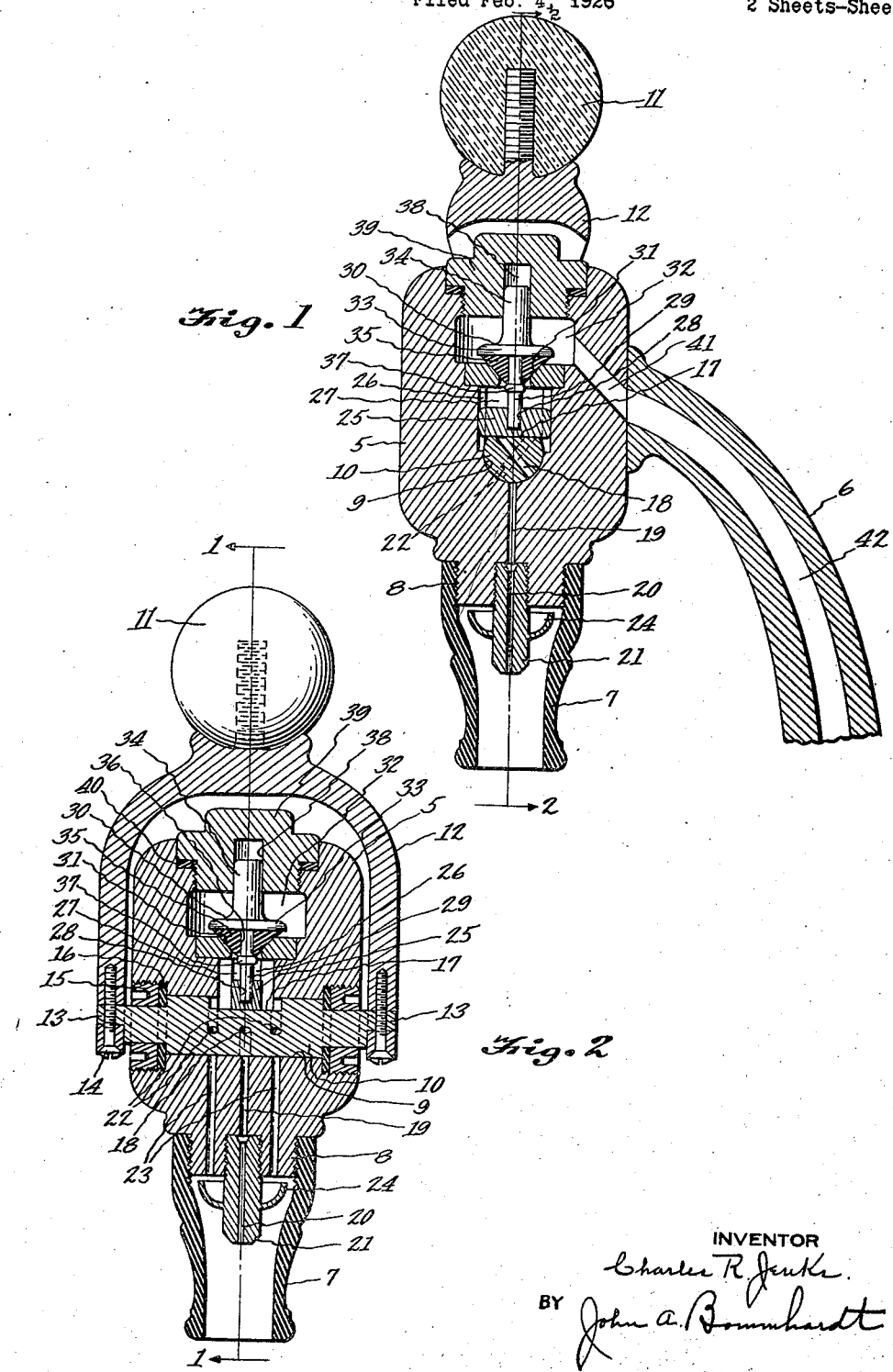
INVENTOR
Charles R. Jenks.
BY John A. Bomhardt
ATTORNEY May 31, 1927.

C. R. JENKS 1,630,947

SODA FOUNTAIN DRAFT ARM VALVE

Filed Feb. 4, 1926 2 Sheets-Sheet 2

INVENTOR
Charles R. Jenks.
BY John A. Bommhardt
ATTORNEY

Patented May 31, 1927.

1,630,947

UNITED STATES PATENT OFFICE.

CHARLES R. JENKS, OF CLEVELAND, OHIO, ASSIGNOR OF ONE-HALF TO CLIFTON M. RAWLINS, OF CLEVELAND, OHIO.

SODA-FOUNTAIN DRAFT-ARM VALVE.

Application filed February 4, 1926. Serial No. 86,015.

This invention relates to improvements in valves and more particularly to soda fountain draft arm valves providing means for eliminating the usual dripping or leaking thereof and for preventing escape of gases from the charging tank.

The improved draft valve comprises a two-way valve with provisions for a direct fine jet and a baffle intercepted coarse spray. The two-way valve embodies a cam for actuating an improved main valve providing a tight closure thereby preventing dripping of soda water and the escape of gases. Other objects and features of the invention will be hereinafter pointed out and described.

In the drawings:

Figure 1 is a vertical section on line 1—1 of Fig. 2, showing the valves closed.

Fig. 2 is a section on line 2—2 of Fig. 1.

Figure 3:
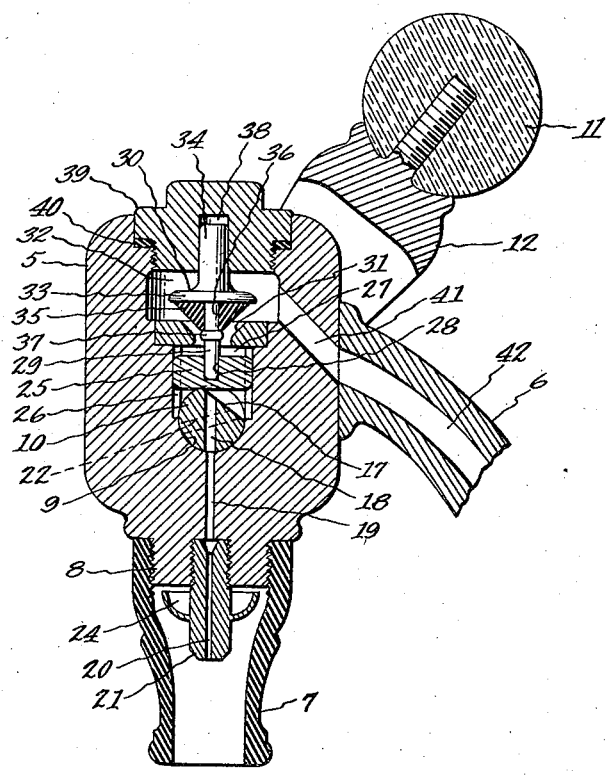
Fig. 3 is a section similar to Fig. 1 showing the valves open for a fine jet.
Figure 4:
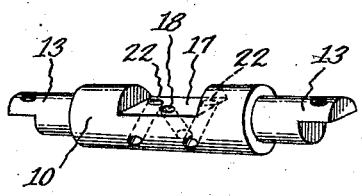
Fig. 4 is a detail view of the two-way valve.

In these drawings 5 indicates a metal valve body carried by a curved arm 6 adapted to be mounted on a soda fountain counter or the like. A nozzle 7 of hard rubber or other suitable material is screw threaded to the lower reduced portion 8 of body 5. A rocking two-way plug valve 10 mounted in transverse bore 9 of body 5 is actuated by means of a handle 11 secured to the top of a yoke 12 having its ends mounted on the protruding reduced ends 13 of valve 10 and secured thereto by screws 14. Packing glands comprising annular screw threaded nuts 15 and packing 16 are provided at the reduced valve ends 13.

The rocking valve 10 has an intermediate flat cam face 17 with an angularly disposed port 18 adapted when turned to register with a central vertical port 19 in body 5 opening into fine jet port 20 in a jet nozzle 21 screw threaded into the bottom of body 5 and is adapted to direct a fine jet of soda water down and out through main nozzle 7.

Additional ports 22 of cam face 17 are arranged almost diametrically opposite to port 18 and are disposed oppositely with reference to angularity. Ports 22 when turned to vertical position register and communicate with ports 23 arranged diametrically on opposite sides of port 19 in body 5. Ports 23 are adapted to direct jets of soda water against an upturned semi-spherical baffle 24 integrally formed on nozzle 21, breaking and deflecting the jets within main nozzle 7 from where the soda water issues in coarse spray. When rocked by handle 11 the cam face 17 causes a block 25 engaging thereon to raise between guides 26 in a chamber 27. A central guide hole 28 in the top of block 25 is adapted to receive the lower end of stem 29 of a main reciprocating valve 30 resting on valve seat 31 mounted in body 5 between chamber 27 and main valve chamber 32.

Main valve 30 comprises stems 29 depending from a disk shaped body 33 having an upwardly extending guide stem 34. An inverted cone shaped washer or valve face 35 of composition or rubber has a central opening 36 adapted to fit on stem 29 against the bottom of disk 33 and is retained thereon by an integral annular bead 37 on stem 29. Stem 34 is guided in the central hole 38 of a guide member 39 screw threaded into the top of body 5, and sealed by washer 40. The threaded opening in body 5 for plug 39 is sufficiently large to permit removal of valve 30 for renewal of washer 35 when same is worn. Valve chamber 32 communicates through supply port 41 and channel 42 in arm 6 to the charging tank supply pipe which is connected at the base of arm 6. The pressure of the carbonated soda water firmly presses the washer 35 of valve 30 upon valve seat 31 slightly expanding the rubber composition, insuring a tight seal against leakage of the gases and soda water.

To obtain a course spray of soda water the handle 11 is rocked forward, turning the valve ports 22 vertically into communication with ports 23, the cam face 17 simultaneously raising block 25. The bottom of guide hole 29 of block 25 engages and lifts valve 30 off of seat 31 permitting the soda water charge to pass from chamber 32 to chamber 27, through ports 22 and 23 against baffle 24 and out of nozzle 7 in the form of a coarse spray. To shut off the coarse spray the handle is moved to vertical position again, returning the valve 10 to its initial position. The main valve 30 is closed and block 25 is returned by gravity and the pressure of the tank charge.

To obtain a fine jet of soda water the handle 11 is rocked backwards, turning the central valve port 18 into communication with body port 19 and jet nozzle port 20, allowing the soda charge to pass from chamber 32 to chamber 27 through ports 18 and 19 and out of nozzle port 20 in the form of a fine jet. Upon returning the handle to vertical the valves resume their initial position shutting off the fine jet.

The soda water may be started to flowing in a coarse spray and then cut off and changed immediately to a fine jet and then shut off by swinging the handle from initial vertical closed position to forward coarse spray position and then backward to fine jet position and last to vertical closed position or vice-versa.

Although I have illustrated my improved valve structure applied as a soda fountain draft arm valve it is obvious that the valve structure is adaptable to many other uses, and changes may be made in the details of construction and parts without departing from the spirit and scope of the appended claim.

I claim:—

The combination of a valve body having an inlet passage with a valve seat and guide therein, a block slidable in said guide, a reciprocating valve cooperating with said seat and provided with a stem engaging in said block and guided thereby, said body also having plural outlet ports, and a rocking valve in the body having ports corresponding to said outlet ports and also having a cam surface on which said block rests, for the purpose described.

In testimony whereof, I do affix my signature.

CHARLES R. JENKS.